US00RE44568E

(19) United States
(12) Reissued Patent
Stepp

(10) Patent Number: US RE44,568 E
(45) Date of Reissued Patent: Nov. 5, 2013

(54) GUN SAFE DOOR STORAGE SYSTEM

(75) Inventor: Richard E. Stepp, Springville, UT (US)

(73) Assignee: Prosteel Security Products, Inc., Provo, UT (US)

(21) Appl. No.: 12/854,762

(22) Filed: Aug. 11, 2010

Related U.S. Patent Documents

Reissue of:
(64) Patent No.: 7,409,790
Issued: Aug. 12, 2008
Appl. No.: 11/674,484
Filed: Feb. 13, 2007

U.S. Applications:
(63) Continuation-in-part of application No. 10/971,584, filed on Oct. 22, 2004, now Pat. No. 7,877,920.

(60) Provisional application No. 60/513,967, filed on Oct. 24, 2003.

(51) Int. Cl.
*F41A 17/00* (2006.01)
*A47F 7/00* (2006.01)

(52) U.S. Cl.
USPC ..... 42/70.01; 42/70.11; 211/4; 211/64; 109/51; 109/50; 206/315.11

(58) Field of Classification Search
USPC ..... 42/70.1, 70.11; 211/4, 64; 109/51; 206/315.11
See application file for complete search history.

(56) References Cited

U.S. PATENT DOCUMENTS

| | | | |
|---|---|---|---|
| 3,421,632 | A | 1/1969 | Wood |
| 3,822,925 | A | 7/1974 | Osroff |
| 3,918,670 | A | 11/1975 | Doherty |
| 3,997,219 | A | 12/1976 | Phelps |
| 4,057,180 | A | 11/1977 | Whittaker |
| 4,095,860 | A | 6/1978 | Henson |
| 4,099,808 | A | 7/1978 | Oakley |
| 4,197,951 | A | 4/1980 | Shassere |
| 4,236,772 | A | 12/1980 | Henson |
| 4,304,447 | A | 12/1981 | Ellwood |
| 4,396,240 | A | 8/1983 | Henson |

(Continued)

FOREIGN PATENT DOCUMENTS

EP 0962731 12/1999

OTHER PUBLICATIONS

Photographs from 2002 Shooting, Hunting, Outdoor Trade Show and Conference ("SHOT Show"—Owned and Sponsored by National Shooting Sports Foundation), DPMS safe on p. 5 of 6.

(Continued)

*Primary Examiner* — J. Woodrow Eldred
(74) *Attorney, Agent, or Firm* — Ostrager Chong Flaherty & Broitman P.C.

(57) ABSTRACT

A gun safe door storage system is permanently affixed to an interior surface of a gun safe door. The door storage system comprises a plurality of integrated pouches or pockets and a rack arranged such that the pouches or pockets are accessible even when the rack is holding rifles or rifle parts, such as barrels. Substantially all of the available space on the interior surface of the door is filled with pockets or pouches. The pouches or pockets are affixed to a backing material having strength and weight sufficient to prevent sagging. The backing material is permanently affixed to the interior surface of the gun safe door. The rack comprises a barrel support and a stock support mounted permanently on the interior surface of the gun safe door over the pouches or pockets.

33 Claims, 6 Drawing Sheets

(56) References Cited

U.S. PATENT DOCUMENTS

| | | | |
|---|---|---|---|
| 4,502,742 | A | 3/1985 | Neff |
| 4,585,127 | A | 4/1986 | Benedict |
| D287,550 | S | 1/1987 | Tocci |
| 4,776,650 | A | 10/1988 | Ferenzi |
| 4,796,762 | A | 1/1989 | Law |
| D300,398 | S | 3/1989 | Krugman |
| 4,859,084 | A | 8/1989 | Kaumeyer |
| D305,153 | S | 12/1989 | Elderkin |
| 4,949,843 | A | 8/1990 | Stokes |
| 4,953,765 | A | 9/1990 | Little |
| 4,978,001 | A | 12/1990 | Nelson |
| 4,986,427 | A | 1/1991 | Law |
| 5,076,442 | A | 12/1991 | Hakeem |
| 5,078,279 | A | 1/1992 | Hancock |
| 5,158,186 | A | 10/1992 | Krut |
| 5,163,745 | A | 11/1992 | Zagata |
| D335,233 | S | 5/1993 | Long |
| D337,467 | S | 7/1993 | Schmidt |
| 5,246,103 | A | 9/1993 | Hicks |
| D343,970 | S | 2/1994 | Campbell |
| 5,282,539 | A | 2/1994 | Saathoff |
| D354,412 | S | 1/1995 | Emery |
| 5,477,967 | A | 12/1995 | Voorhees |
| 5,495,969 | A | 3/1996 | Cardenas |
| 5,511,873 | A | 4/1996 | Mech |
| 5,626,379 | A | 5/1997 | Scott |
| 5,645,178 | A | 7/1997 | Conley, Jr. |
| 5,685,624 | A | 11/1997 | Lee |
| 5,695,073 | A | 12/1997 | Klein |
| 5,758,936 | A | 6/1998 | Baughan |
| 5,797,500 | A | 8/1998 | Lacoste |
| 5,887,730 | A | 3/1999 | St. George |
| 5,894,940 | A | 4/1999 | Gusdorf |
| 5,957,308 | A | 9/1999 | Zierenberg |
| 6,042,207 | A | 3/2000 | Crosby |
| D429,897 | S | 8/2000 | Rogman |
| D429,938 | S | 8/2000 | Allen |
| 6,098,815 | A | 8/2000 | Nesser |
| 6,126,021 | A | 10/2000 | Wilhite |
| 6,138,841 | A | 10/2000 | Klein |
| 6,238,030 | B1 | 5/2001 | Matselboba |
| 6,302,052 | B1 | 10/2001 | Sauerwein |
| 6,361,130 | B1 | 3/2002 | Kardy |
| 6,386,379 | B1 | 5/2002 | Battaglia |
| 6,394,287 | B2 | 5/2002 | Cabrera |
| 6,464,086 | B1 | 10/2002 | Klein |
| 6,467,613 | B2 | 10/2002 | Felsenthal |
| 6,533,127 | B1 | 3/2003 | Klein |
| 6,581,786 | B1 | 6/2003 | King |
| D499,286 | S | 12/2004 | Harwanko |
| D501,106 | S | 1/2005 | Suero, Jr. |
| 6,857,528 | B2 | 2/2005 | Klein |
| 6,868,975 | B2 | 3/2005 | Sells |
| 6,997,526 | B2 | 2/2006 | Leimkuehler |
| 7,198,835 | B2 | 4/2007 | Anderson |
| 7,478,892 | B2 | 1/2009 | Punzel |
| 2003/0011291 | A1 | 1/2003 | Moreno-Olguin |
| 2003/0085188 | A1 | 5/2003 | Klein |
| 2003/0213720 | A1 | 11/2003 | Nesselrodt |
| 2004/0124116 | A1 | 7/2004 | Long |
| 2004/0130250 | A1 | 7/2004 | Cleveland |
| 2004/0140235 | A1 | 7/2004 | Cleveland |
| 2004/0140280 | A1 | 7/2004 | Cleveland |
| 2004/0183416 | A1 | 9/2004 | Becke |
| 2004/0222125 | A1 | 11/2004 | Meing |
| 2005/0133473 | A1 | 6/2005 | Lesperance |
| 2006/0186071 | A1 | 8/2006 | Rowan |
| 2006/0186775 | A1 | 8/2006 | Becke |

OTHER PUBLICATIONS

Heritage Safe Co. 1999 Brochure, page displaying safes and inside of safes.

Buckmasters Online Magazine, "New Products," web page url <http://www.buckmasters.com/Buckmasters_Links/New_Products/NPSentryRU9889.html>, p. 1, printout dated Oct. 18, 2004.

Liberty Safe, "About Liberty Safe," web page url <http://www.libertysafe.com/about.lasso?-Token.link=4in1flex>, p. 1, printout dated Oct. 18, 2004.

Arizona Safe Keeper, "Gun Safe Accessories," web page url <http://www.arizonasafekeeper.com/skpistol.html>, p. 1, printout dated Oct. 18, 2004.

Sentry Group, "Gun Safe/Executive Safe Owner's Manual," web page url <http://www.sentrysafe.com/pdfs/ownersmanuals/172752.pdf>.

Browning, "G28F Gold Series Gun Safe with "Duo-Plus"," web page url <http://browning.com/products/catalog/safes/detail.asp?cat_id=160&type_id=42741&value=001F>, printout dated Feb. 5, 2007, manufactured by ProSteel, the Assignee herein.

Browning, "Safe-hold System Accessories," web page url <http://www.browning.com/products/catalog/safes/detail.asp?cat_id=154&type_id=401&value=004F> printout dated Feb. 5, 2007.

Cannon Safe, "Door Panel Pistol Kit," web page url <http://www.cannonsafe.com/safespecialorder/>, printout dated Feb. 4, 2007.

Liberty Safe, "Door-Mounted Pistol Pockets," web page url <http://www.libertysafe.com/accessory.lasso?type=pistol pocket>, printout dated Feb. 4, 2007.

GUN SAFE DOOR STORAGE SYSTEM

Matter enclosed in heavy brackets [ ] appears in the original patent but forms no part of this reissue specification; matter printed in italics indicates the additions made by reissue.

RELATED APPLICATIONS

This application is a continuation-in-part of commonly-owned and U.S. patent application Ser. No. 10/971,584, filed Oct. 22, 2004 *now U.S. Pat. No. 7,877,920*, which claims priority from U.S. Provisional Patent Application No. 60/513,967 filed on Oct. 24, 2003, the disclosures of which are incorporated in their entireties by reference herein.

FIELD OF INVENTION

This invention generally relates to an apparatus for holding firearms and other items on the door of a gun safe. More specifically, the invention relates to a gun safe door storage system for rifles, guns, and firearm supplies and accessories.

BACKGROUND OF INVENTION

The use of gun safes for storing and preventing unauthorized access to firearms and firearm supplies (such as ammunition) and accessories is well known. An example of a prior art gun safe is shown in FIG. 1. The interior of such prior art gun safes generally includes several shelves 2 and a rack 4 for storing rifles in a vertical position. Because the storage components are all located in the interior portion of the gun safe, the gun safe's door 6 must be substantially opened to provide access to the firearms, supplies and accessories stored therein (not shown), and a user would have to reach into the gun safe to remove any of the items stored therein.

It is also known to attach devices to the interior surface of a safe door in order provide additional means for storing firearms, supplies and accessories. For example, U.S. Pat. No. 5,957,308 to Zierenberg discloses a system for hanging pistols on the interior surface of a safe door, including a retrofitable (or removable) panel hung over the top edge of the door made from a hook-and-loop type material (such as VELCRO) and removable fabric holsters or pouches for holding pistols or other valuables also made from a hook-and-loop type material, such that the pouches are easily movable.

Other means for storing firearms, supplies or accessories on the interior surface of a gun safe door are disclosed in the Sentry® FIRE-SAFE® Gun Safes (e.g., Model GT8423). The Sentry® safes include an optional restraint cord system consisting of a bungee cord secured to the interior surface of the door in a zig-zag pattern around pegs secured through the interior surface of the door. Alternatively, hooks may be secured to the interior surface of the door for hanging items, such as spare gun barrels, pistols, binoculars, etc. The Sentry® safes may also include a door pocket recessed into the door's interior surface.

However, none of the prior art provides a means for storing rifles on the door of a gun safe to provide easier access and to reduce the risk of damage (e.g., nicks and scratches) to the rifles. As used herein, the term "rifle" generally refers to a firearm with an elongated barrel and a stock having a butt. Thus, the term "rifle" refers not only to rifles but also includes shotguns, carbines and other similar firearms. It is a broad object of the invention to provide a gun safe door storage system that provides easy access to rifles, minimizes risk of damage to rifles, and also provides a wide range of storage options for firearm supplies and accessories to efficiently maximize the use of space on the interior surface of a gun safe door.

SUMMARY OF INVENTION

In the present invention, the foregoing purposes, as well as others that will be apparent, are achieved generally by providing a gun safe door storage system that is permanently affixed to an interior surface of a gun safe door. The door storage system comprises a plurality of integrated pouches or pockets and a rifle rack arranged such that the pouches or pockets are accessible even when the rifle rack is holding rifles. Substantially all of the available space on the interior surface of the door is filled with pockets or pouches. The pouches or pockets are affixed to a backing material having strength and weight sufficient to prevent sagging. The backing material is permanently affixed to the interior surface of the gun safe door.

A rifle rack comprising a barrel support and a stock support is mounted permanently on the interior surface of the gun safe door over the pouches or pockets. The stock support is mounted on a lower portion of gun safe door and comprises one or more butt recesses or slings for receiving and securing the butt end of a rifle stock. The barrel support is mounted on an upper portion of the gun safe door at a distance above the stock support. The barrel support has one or more barrel holes or other means for receiving and securing a rifle barrel.

DESCRIPTION OF PREFERRED EMBODIMENTS

Figure 1:
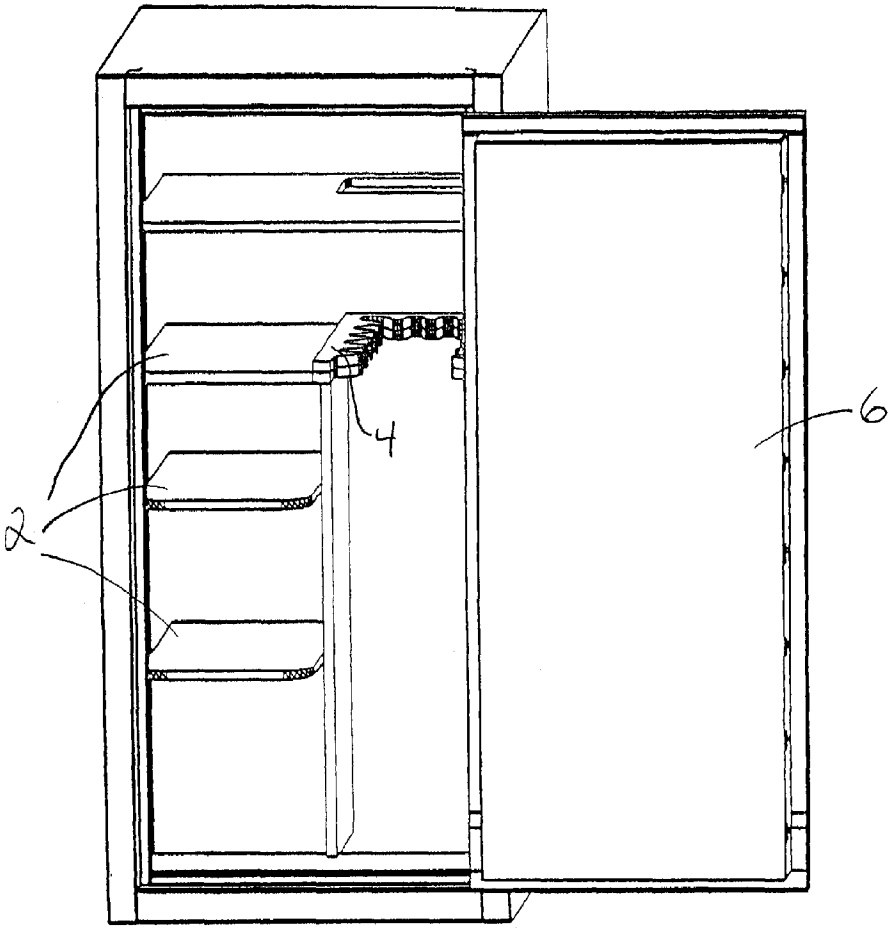
FIG. 1 (PRIOR ART)
FIG. 1 is a front elevational view of a prior art gun safe with the safe door in an open position.
Figure 3:
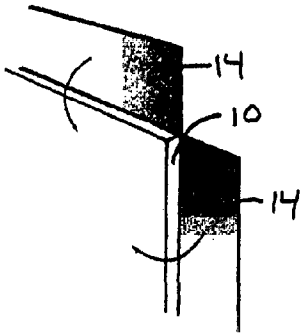
FIG. 3 is a rear, right and top side perspective view of the door storage system prior to attachment to an interior panel of a gun safe door.
Figure 2:
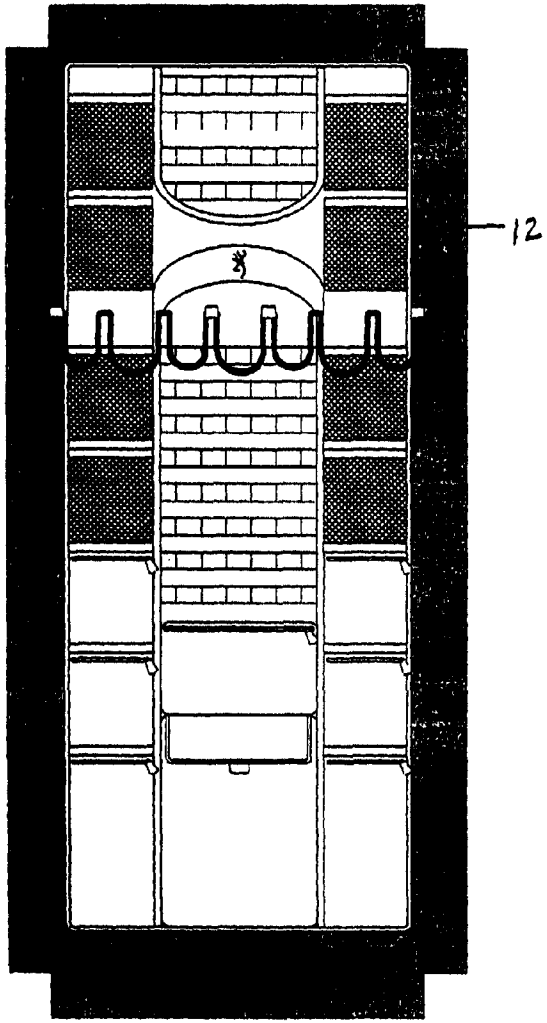
FIG. 2 is a front elevational view of a gun safe door storage system prior to attachment to an interior panel of a gun safe door.

A gun safe door storage system is shown in FIGS. 2-5. Referring to FIGS. 2 and 3, the interior portion of a gun safe door typically includes an interior panel 10 made from a sturdy material, such as sheet rock or sheet metal. The door storage system comprises a backing material 12 of sufficient size to cover the entire interior panel 10 of the gun safe door, and has flaps 14 extending past the top, bottom and side edges of the interior panel 10. The flaps 14 wrap around the edges of the interior panel 10 (as indicated by the arrows in FIG. 3) and are affixed to the opposite side of the interior panel 10. The backing material 12 (including the flaps 14) is preferably affixed to the interior panel 10 by adhesive (hot-melt or pressure-sensitive), but may also be affixed by staples or other means of permanently affixing a flexible sheet on a flat surface, or any combination thereof. The backing material 12 is preferably Oxford Cloth (available from Wujiang Liufeng Silk Cloth Corporation Ltd., Jiangsu Province, China) or a heavy nylon material. A thin (preferably about ⅛ inch thick) plastic stiffener material is typically attached to one side of the Oxford Cloth by adhesive or stitching. Any other material that provides sufficient strength and durability to prevent sagging when the door storage system is in use may be used.

Figure 5:
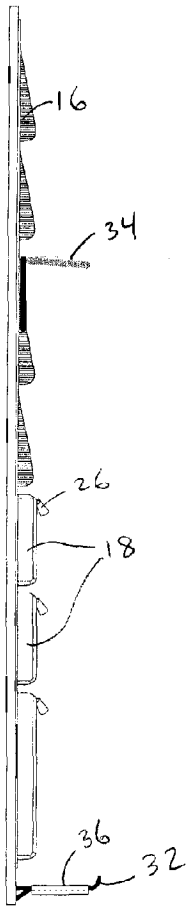
FIG. 5 is a side view of the gun safe door storage system shown in FIG. 4.
Figure 4:
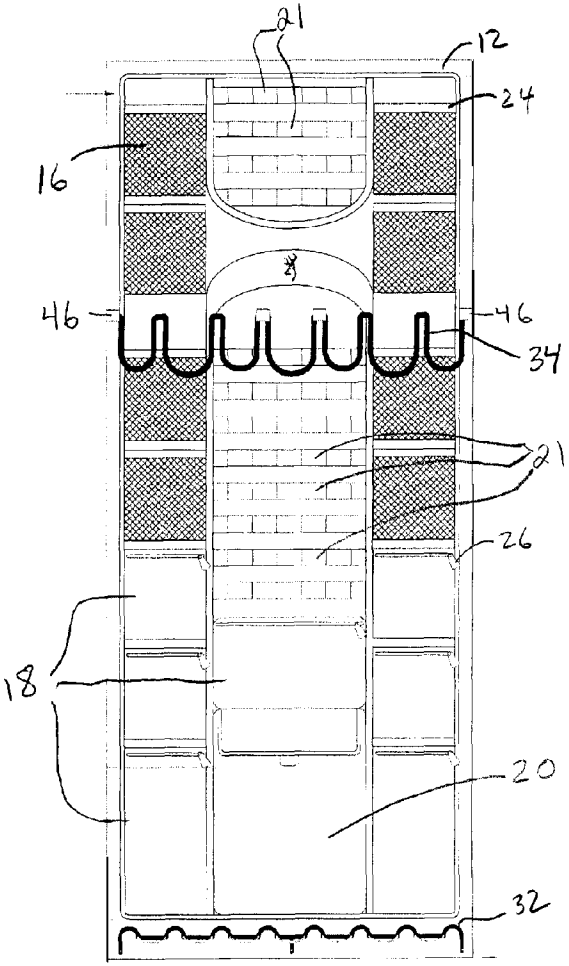
FIG. 4 is a front elevational view of a gun safe door storage system after attachment to an interior panel of a gun safe door.
Figure 6:
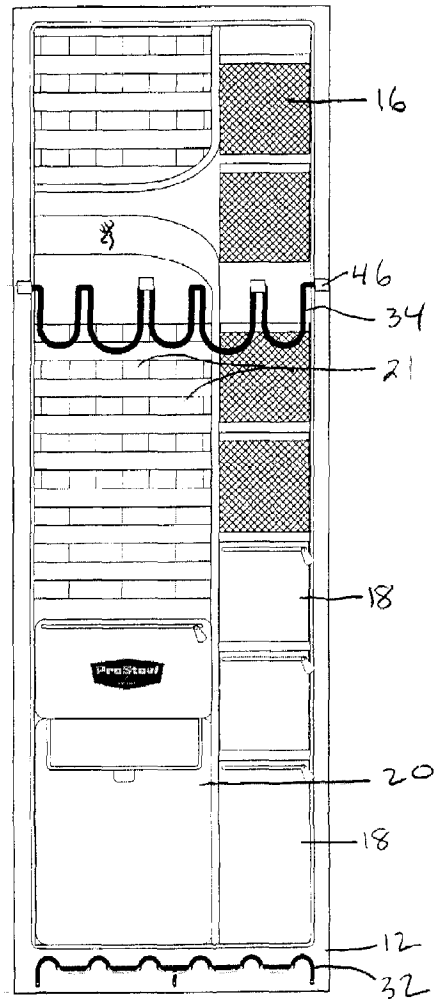
FIG. 6 is an alternate embodiment of a gun safe door storage system.

Referring now to FIGS. 4 and 5, the door storage system is permanently affixed to and integrated into a gun safe door. The door storage system comprises a plurality of integrated pouches or pockets 16, 18, 20, straps 21 and a rifle rack 22 arranged such that the pouches, pockets and straps are accessible even when the rifle rack is holding rifles (not shown). Substantially all of the available space on the interior surface of the door is filled with pockets, pouches and straps. The pouches, pockets and straps 16, 18, 20, 21 are affixed to the backing material 12, preferably by stitching or adhesive. It should be understood that the pockets, pouches and straps shown in FIGS. 2-5 are just one example of the types of pockets, pouches and straps that may be used. Many different size and shape pockets, pouches and straps may be selected and arranged in any configuration depending on the intended use and the size of the gun safe door. For example, an alternate arrangement on a smaller gun safe door is shown in FIG. 6.

As shown in FIGS. 4 and 5, a mesh pocket 16 comprises a mesh material affixed to the backing material 12 on the sides and gathered and affixed at the bottom, typically be stitching. An elastic band 24 is disposed at the top and affixed to the backing material 12 only on the sides such that the band can be pulled away from the backing material to provide access to the pocket 16. When not in use, the elastic band 24 is flush with the surface of the backing material 12 (see FIG. 5). The mesh material may be provided in varying sizes depending on the desired size of the pocket 16.

Figure 7B:
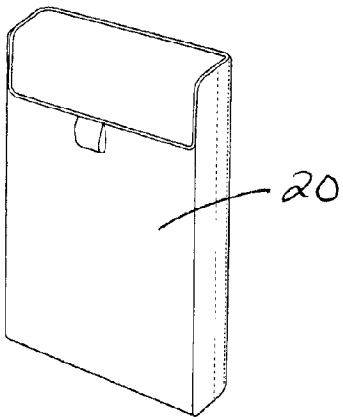
FIG. 7B is a perspective view of a pocket for use in a gun safe door storage system, in a closed position.
Figure 7A:
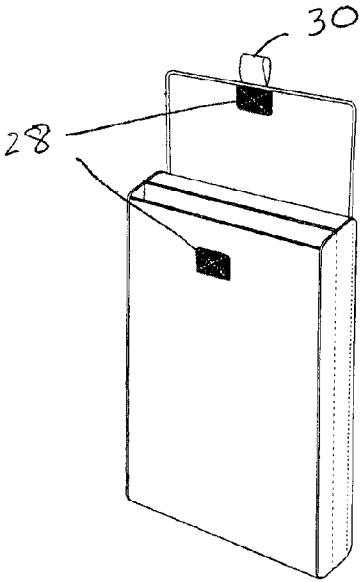
FIG. 7A is a perspective view of a pocket for use in a gun safe door storage system, in an open position.

Pockets 18 and 20 comprise a pre-formed pouch affixed to the backing material 12, typically by stitching. The pouch may be provided in varying sizes and shapes depending on the desired size and use of the pouches. The pouches may be closed with a zipper closure device, having a zipper pull 26 or a hook-and-loop closure device 28, such as VELCRO. A pouch having a VELCRO closure device 28 and a loop pull 30 to facilitate opening and closing the pouch is shown in FIGS. 7A (open) and 7B (closed).

Figure 8:
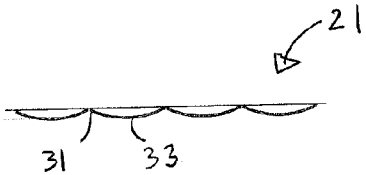
FIG. 8 is a top view of a strap for use in a gun safe door storage system.

Straps 21 comprise a material that may or may not be elastic. For example, a heavy nylon belt or a flat elastic strap may be used, or any combination thereof. The material is affixed to the backing material 12 in spaced-apart vertical lines 31 by adhesive or stitching. The fabric material is gathered between the vertical lines to form a plurality of loops 33 to holding various firearm accessories and supplies. (See FIG. 8). The vertical lines 31 may be spaced at any interval depending on the desired end use.

Figure 10B:
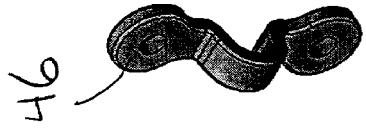
FIG. 10B is a perspective view of a bracket for attaching the barrel support of FIG. 10A to the door storage system of FIG. 4.
Figure 9:
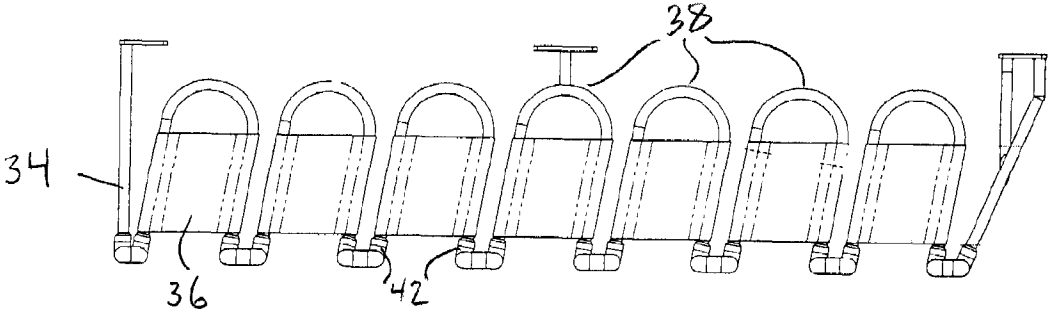
FIG. 9 is a perspective view of a stock support for use with the door storage system of FIG. 4.
Figure 10A:
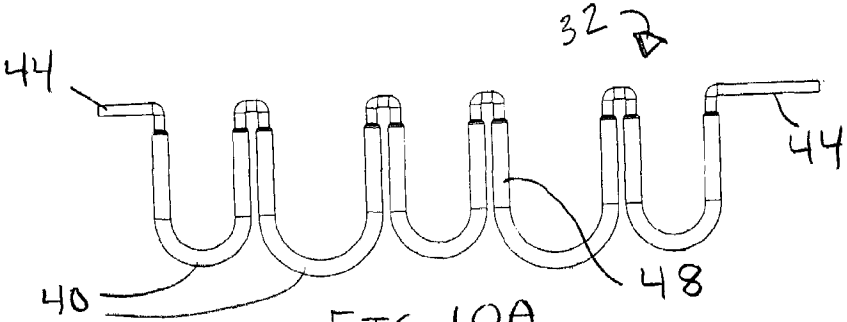
FIG. 10A is a perspective view of a barrel support for use with the door storage system of FIG. 4.

Referring again to FIGS. 4 and 5, a rifle rack comprises a barrel support 32 and a stock support 34, each separately and permanently mounted to the interior panel 10 of the gun safe door through the backing material 12. The barrel and stock supports may be of the types disclosed in co-pending U.S. application Ser. No. 10/971,584 (the disclosure of which is incorporated by reference herein in its entirety). Alternatively, the stock support 34 and barrel support 32 may be made from a metal or metal alloy, such as stainless steel, rod bent and formed into a plurality of U-shaped holders 38, 40 (see FIGS. 9 and 10). The open ends of the U-shaped holders of the stock support 34 face outward from the interior panel 10 when the stock support 34 is installed onto the interior panel 10. A mesh or nylon sling material 36 is attached between the outer prongs 42 of the U-shaped holders 38 for receiving and securing the butt end of a rifle stock. Use of this type of butt support is less expensive because it uses less material, and is easy to manufacture and install onto the interior panel 10.

The barrel support 32 is mounted on an upper portion of the gun safe door at a distance above the stock support such that the open ends of the U-shaped holders are disposed adjacent the interior panel 10. This permits the closed end of the U-shaped holders to receive and secure a rifle barrel. Each end of the barrel support 32 extends to form a pin 44 that is used for mounting the barrel support 32 onto the interior panel 10. The pins fit into brackets 46 mounted on both sides of the door to permit the barrel support 32 to pivot 180 degrees. (See FIG. 10A) Thus, when there are no rifles in the rack, the barrel support 32 can lay flat against the backing material 12. The barrel support may also be installed without this pivoting feature.

The U-shaped holders 40 are dimensioned to allow rifle barrels to be easily inserted or removed therefrom and to securely hold rifle barrels as the safe door opens and closes. Each U-shaped holder 40 is positioned on the barrel support 32 so that is registers with a corresponding U-shaped holder 38 in the stock support 34 when the barrel support and stock support are mounted on the interior panel 12. Each U-shaped holder 40 coacts with a corresponding U-shaped holder 38 to receive, secure and hold a rifle upright on the rifle rack Preferably, each U-shaped holder 40 is provided with a vinyl dip cover 48 or other material suitable for securing and protecting rifle barrels.

The barrel and stock supports 32, 34 may be affixed to the interior panel 10 by gluing, welding, riveting or with fasteners, preferably self tapping sheet metal screws that anchor into steel Z bars (not shown) that are attached to the safe door.

The barrel support 32 is positioned above the stock support 34 at a height sufficient to allow the barrel support and butt support to securely hold rifles of the size generally used by sportsmen, hunters and gun enthusiasts but still allow rifles to be easily placed into or removed from the rifle rack. In the embodiment shown in FIG. 4, the distance between the barrel support 32 and stock support 34 is about thirty-six inches. However, it is to be understood that barrel supports and stock supports separated by a greater distance or lesser distance that allow the rifle rack to be used with longer or shorter rifles, or to hold rifle parts, such as barrels, is within the scope of the present invention. A rifle (not shown) is stored in the rifle rack by first inserting the rifle barrel into a U-shaped holder 40 of the barrel support 32 from below and then placing the rifle butt into a corresponding U-shaped holder 38 of the stock support 34.

Although the invention has been described with reference to preferred embodiments, it will be appreciated by one of ordinary skill in the art that numerous modifications are possible in light of the above disclosure. For example, in an alternate embodiment (not shown) the butt support comprises a unitary structure having one or more butt recesses. In addition, one or more barrel holes may be provided with a locking means to limit access to particular rifles. In another alternate embodiment (not shown), the barrel support may be split cross-wise into two or more pieces that are mounted on the safe door at different heights above the stock support. This would enable rifles of varying lengths, or rifle parts, such as barrels, to be stored on the rifle rack. All such variations and modifications are intended to be within the scope and spirit of the invention.

I claim:

1. A storage system for use in a gun safe having a door with an interior surface, the system comprising:

a backing material permanently affixed to the interior surface of the door;

a plurality of pockets permanently affixed to the backing material; and a rack affixed to the interior surface of the door over the backing material and the plurality of pockets, such that space on the interior surface of the door is maximized

2. A storage system according to claim 1, wherein the rack comprises:

a barrel support affixed to the interior surface of the door over the backing material and the plurality of pockets; and a stock support affixed to the interior surface of the door over the backing material and the plurality of pockets.

3. A storage system according to claim 2, wherein the barrel support is positioned on the interior surface of the door at a height above the stock support.

4. A storage system according to claim 3, wherein the height is sufficient to store rifles in the rack.

5. A storage system according to claim 1, wherein the plurality of pockets are selected from the group consisting of gathered and sewed pockets and pre-formed pockets.

6. A storage system according to claim 5, wherein the gathered and sewed pockets comprise a mesh material affixed to the backing material on three sides and an elastic top band.

7. A storage system according to claim 1, further comprising a plurality of straps affixed to the backing material to form horizontal loops for storage.

8. A gun safe having a door with an interior surface, comprising:

a backing material permanently affixed to the interior surface of the door;

a plurality of pockets permanently affixed to the backing material; and a rack affixed to the interior surface of the door over the backing material and the plurality of pockets, such that space on the interior surface of the door is maximized.

9. A gun safe according to claim 8, wherein the rack comprises:

a barrel support affixed to the interior surface of the door over the backing material and the plurality of pockets; and a stock support affixed to the interior surface of the door over the backing material and the plurality of pockets.

10. A gun safe according to claim 9, wherein the barrel support is positioned on the interior surface of the door at a height above the stock support.

11. A gun safe according to claim 10, wherein the height is sufficient to store rifles in the rack.

12. A gun safe according to claim 8, wherein the plurality of pockets are selected from the group consisting of gathered and sewed pockets and pre-formed pockets.

13. A gun safe according to claim 12, wherein the gathered and sewed pockets comprise a mesh material affixed to the backing material on three sides and an elastic top band.

14. A gun safe according to claim 8, further comprising a plurality of straps affixed to the backing material to form horizontal loops for storage.

15. A method for storing items in a gun safe have a door with an interior surface, the method comprising the steps of:

permanently affixing a backing material to the interior surface of the door;

permanently affixing a plurality of pockets to the backing material; and affixing a rack to the interior surface of the door over the backing material and the plurality of pockets, such that space on the interior surface of the door is maximized.

16. A method according to claim 15, wherein the backing material is permanently affixed to the interior surface of the door by applying adhesive between the interior surface of the door and the backing material.

17. A method according to claim 15, wherein the pockets are affixed to the backing material by stitching around a border of each of the pockets.

18. A method according to claim 15, further comprising the step of permanently affixing a strap in a generally horizontal disposition across the interior surface of the door to provide additional storage options.

*19. A storage system for use in a gun safe having a door with an interior panel, the system comprising: a backing material permanently affixed to the interior panel of the door; a plurality of pockets permanently affixed to the backing material; and a rack positioned on the interior panel of the door for holding at least one rifle, the backing material covering an entire inner surface of the interior panel and comprising flaps extending past and wrapped around a top edge, a bottom edge and side edges of the interior panel, the flaps being secured to the interior panel on a surface opposite the inner surface.*

*20. A storage system according to claim 19, further comprising a plurality of straps permanently affixed to the backing material such that a substantial portion of the surface area of the inner surface of the interior panel is filled with pockets and straps.*

*21. A storage system according to claim 19, wherein the rifle rack comprises a stock support positioned on a lower portion of the inner surface of the interior panel and comprising at least one butt recess disposed at an acute angle relative to the interior surface of the safe door, and a barrel support positioned on an upper portion of the interior surface of the interior panel, each of the stock support and the barrel support having an outer edge extending away from the inner surface at a right angle and tapering to an acute angle relative to the inner surface to form a cut-away portion in the outer edge of each of the barrel support and the stock support.*

*22. A storage system for use in a gun safe having a door with an interior panel, the system comprising: a backing material covering an entire inner surface of the interior panel, the backing material comprising storage elements filling a substantial portion of the surface area of the inner surface of the interior panel and flaps extending past and wrapped around a top edge, a bottom edge and side edges of the interior panel, the flaps being secured to the interior panel on a surface opposite the inner surface; and a rack positioned on the interior panel for holding at least one rifle.*

*23. A storage system according to claim 22, wherein the storage elements comprise a plurality of pockets and straps permanently affixed to the backing material.*

*24. A storage system according to claim 22, wherein the rack comprises a stock support positioned on a lower portion of the inner surface of the interior panel and a barrel support positioned on an upper portion of the inner surface.*

*25. A storage system for use in a gun safe having a door with an interior panel, the system comprising: a backing material covering an entire inner surface of the interior panel, the backing material comprising flaps extending past and wrapped around a top edge, a bottom edge and side edges of the interior panel, the flaps being secured to the interior panel on a surface opposite the inner surface; the backing material comprising storage elements filling a substantial portion of the surface area of an inner surface of the interior panel.*

*26. A storage system according to claim 25, wherein the storage elements comprise a plurality of pockets and straps permanently affixed to the backing material.*

*27. A storage system according to claim 25, further comprising a stock support positioned on a lower portion of the inner surface of the interior panel and a barrel support positioned on an upper portion of the inner surface to secure a rifle to the inner surface of the interior panel.*

*28. A method for storing items in a gun safe having a door with an interior panel, the door being hingedly attached to a first side frame of the gun safe, the method comprising:*

*covering an inner surface of the interior panel with a backing material comprising flaps that extend past a top edge, a bottom edge and side edges of the interior panel and a plurality of pockets and straps permanently affixed to backing material, such that substantially the entire inner surface is covered with pockets and straps;*

*wrapping the flaps around the top edge, the bottom edge and the side edges;*

*securing the flaps to the interior panel on a surface opposite the inner surface.*

*29. A method according to claim 28, further comprising positioning a stock support on a lower portion of the inner surface of the interior panel and a barrel support on an upper portion of the inner surface to secure a rifle to the inner surface.*

*30. A gun safe comprising: a door having an interior panel; a backing material affixed to the interior panel and covering an entire inner surface of the interior panel, the backing material comprising flaps extending past and wrapped around a top edge, a bottom edge and side edges of the interior panel, the flaps being secured to the interior panel on a surface opposite the inner surface; a plurality of pockets permanently affixed to the backing material; and a rack positioned on the interior panel for holding at least one rifle.*

*31. A gun safe according to claim 30, further comprising a plurality of straps permanently affixed to the backing material such that a substantial portion of the surface area of the inner surface of the interior panel is filled with pockets and straps.*

*32. A gun safe comprising a door having an interior panel; a backing material covering an entire inner surface of the interior panel, the backing material comprising flaps extending past and wrapped around a top edge, a bottom edge and side edges of the interior panel, the flaps being secured to the interior panel on a surface opposite the inner surface; the backing material comprising storage elements filling a substantial portion the surface area of the inner surface of the interior panel.*

*33. A gun safe according to claim 32, wherein the storage elements comprise a plurality of pockets and straps permanently affixed to the backing material.*

* * * * *